United States Patent
Schaefer et al.

(10) Patent No.: US 6,646,359 B2
(45) Date of Patent: Nov. 11, 2003

(54) ELECTRONIC DEVICE WITH A HOUSING FOR ATTACHMENT TO A PANE OF A MOTOR VEHICLE

(75) Inventors: Heiko Schaefer, Erwitte (DE); Michael Schulte, Paderborn (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

(21) Appl. No.: 10/124,396

(22) Filed: Apr. 18, 2002

(65) Prior Publication Data

US 2002/0155734 A1 Oct. 24, 2002

(30) Foreign Application Priority Data

Apr. 20, 2001 (DE) .......................................... 101 19 219

(51) Int. Cl.$^7$ .................................................. B60L 1/00
(52) U.S. Cl. ..................... 307/9.1; 307/10.1; 307/116; 307/118
(58) Field of Search ................................. 307/9.1, 10.1, 307/117, 116, 118; 340/602, 425.5; 200/DIG. 40, 182, 183; 174/17 VA; 361/601; 318/483; 250/227.25, 573

(56) References Cited

U.S. PATENT DOCUMENTS

| 5,081,327 | A | * | 1/1992 | Graham et al. ............. 174/52.4 |
| 5,572,017 | A | * | 11/1996 | Veltum et al. .......... 250/227.25 |
| 6,337,491 | B1 | * | 1/2002 | Krieg et al. ................. 250/573 |

FOREIGN PATENT DOCUMENTS

| DE | 37 17 050 | 12/1988 |
| DE | 42 10 979 | 10/1993 |
| DE | 969 03 598 | 3/1998 |
| DE | 198 27 044 | 10/1999 |
| EP | 0 902 609 | 3/1999 |

* cited by examiner

Primary Examiner—Brian Sircus
Assistant Examiner—Robert L Deberadinis
(74) Attorney, Agent, or Firm—Birch, Stewart, Kolasch & Birch, LLP

(57) ABSTRACT

An electronic device with a housing for being attached to a pane of a motor vehicle by a coupling medium of flexible rubber- or gel-like material includes an exhaust duct for connecting an area of potential bubble formation between the vehicle pane and the coupling medium to ambient air. The exhaust duct prevents the permanent trapping of air bubbles during mounting of the device on the vehicle pane.

20 Claims, 1 Drawing Sheet

ELECTRONIC DEVICE WITH A HOUSING FOR ATTACHMENT TO A PANE OF A MOTOR VEHICLE

BACKGROUND OF THE INVENTION

This application claims a priority from German application 101 19 219.3, filed Apr. 20, 2001, and the contents of that German application are incorporated by reference herein.

The present invention relates to an electronic device with a housing for attachment to a pane of a motor vehicle, wherein the coupling of the housing to the vehicle pane is effected through a coupling medium of a flexible rubber- or gel-like material.

When adapting electronic devices to panes of vehicles, for functional and/or design-related reasons it is necessary to directly couple the electronic devices to the vehicle panes through a coupling medium typically of a flexible rubber- or gel-like material, like Silgel, for example, or a molded silicone part.

The coupling medium may serve the purposes of optical as well as mechanical coupling of the electronic device (such as, for example, rain sensor, light sensor, pre-crash sensor, camera systems, compass sensor, toll sensor, parking sensor circuits, sensor circuits for adaptive velocity control etc.). These devices are either directly agglutinated (adhered) on the pane surface by the coupling medium, or they are pressed against the pane by a continuously-acting spring element, with the coupling medium to be utilized not applying any holding force.

In this context, the adaptation of a particular device to a surface of a vehicle pane is important. Panes of vehicles generally have deviations (tolerances) with regard to their curvature geometry. In consequence, the coupling medium has to compensate for these tolerances in the panes in order to ensure the function and/or the desired outer appearance (design) of the device to be coupled. This compensation for tolerances by the coupling medium is subject to limitations.

For functional and/or process-related reasons during manufacturing, the structure of the coupling medium is restricted. Thus, the shape of the coupling medium can in general be realized only for a limited range of pane curvatures. This has the consequence that a clean and, above all, bubble-free coupling is highly problematic for panes having greatly differing curvatures.

Especially when the pane surfaces are greatly curved, there is the risk of enclosing air bubbles during the mounting of the device. Coupling media, like for example Silgels, can eliminate smaller air bubbles to a certain extent, depending on time and contact pressure. Larger air bubbles, however, will remain within the region of the coupling medium. Through contact pressure of the spring element, a balanced pressure ratio between coupling medium and enclosed air bubble is reached. Due to a viscosity typical for such coupling media, an interior pressure inside the coupling medium can be distinctly higher in an edge region of an area to be coupled than in a region of the enclosed air bubble.

This effect directly depends on the shape of the surface of the device to be coupled and the pane curvature within the mounting area. In consequence, the enclosed air bubble, due to its tendency to expand, will typically migrate to the region between the coupling medium and the pane having the lowest internal pressure in the coupling medium. If the device contour is round, for example, this causes the enclosed air bubble to migrate to the middle of the coupling area during adaptation to a curved pane. Thus, the air bubble is uniformly surrounded by coupling material at a higher internal pressure and hence cannot escape in order to expand outside the region of the coupling medium to atmospheric pressure.

The tendency to enclose air bubbles as well as the location of their occurrence depends directly on the pane curvature and the structure of the device surface, including the coupling medium.

It is an object of this invention to provide an electronic device structured such that it can be coupled to a vehicle pane without air bubbles.

SUMMARY OF THE INVENTION

According to principles of the invention, an exhaust duct connected to the ambient air is located in a region of potential bubble formation between the vehicle pane and a coupling medium.

The surface of the device and/or the coupling medium is therefore advantageously shaped in such a way that bubbles that might be formed during mounting always have a chance to escape (exhaust).

BRIEF DESCRIPTION OF THE DRAWINGS

The invention is described and explained in more detail with reference to the drawings. The described and drawn features can be used individually or in preferred combinations in other embodiments of the invention. Other objects, features and advantages of the invention will be apparent from the following, more particular description of the invention, as illustrated in the drawings in which reference characters refer to the same parts throughout the different views. The drawings are not necessarily to scale, emphasis instead being placed upon illustrating principles of the invention in a clear manner.

Each of FIGS. 1 and 2 is an isometric view of a device according to principles of this invention, each showing a different embodiment.

DESCRIPTION OF THE PREFERRED EMBODIMENTS

Figure 1:
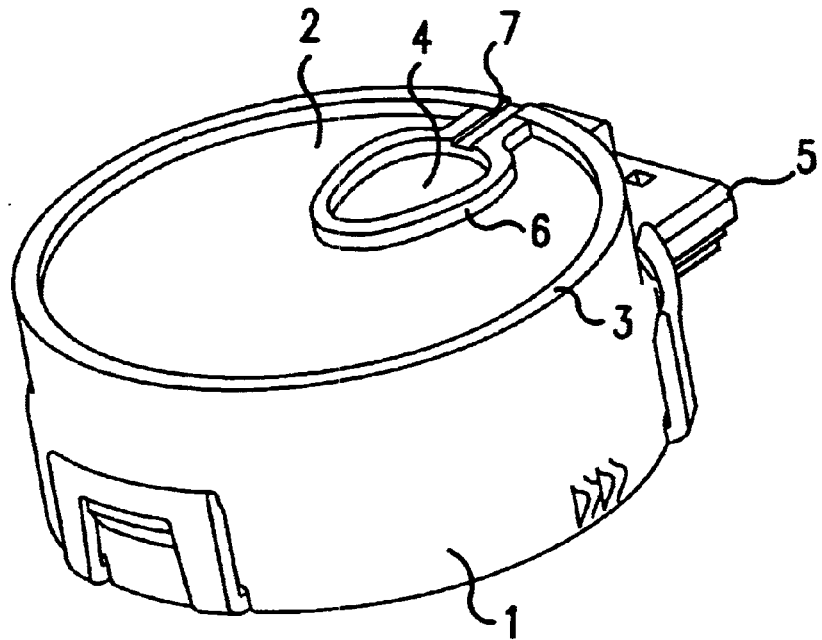

In the following, two embodiments of an electronic device of this invention are described in more detail with reference to the drawing. Since the two embodiments have many features in common, these features are indicated using the same reference numerals. Initially, the following description applies to both figures.

Represented is a light sensor for a motor vehicle. The device has a cylindrical housing 1 with various sensors arranged therein. Further, a circuit configuration (not shown) for controlling the sensors and/or for processing sensor signals can be provided in the housing. Electrical signals enter and leave the device via a connector 5 molded to the housing 1.

At its end, or abutting, face 2, the housing 1 defines a light-entrance opening for an optical sensor 4 that detects a surrounding brightness of the vehicle.

The end face 2 of the housing 1 has a first rim 3 that extends the side of the cylindrical housing 1 beyond the end face 2. Within this first rim 3, a flexible rubber- or gel-like coupling medium (not shown in the drawings), for example Silgel or a shaped silicone part is placed on the end surface for allowing optical and mechanical coupling of the device to a vehicle pane.

The following problem arises when mounting the housing to the vehicle pane (not shown in the drawing): In those areas preferably used for attaching such devices, the vehicle panes have a curvature which is generally concave in the direction of the device, which is, moreover, subject to substantial tolerances. Depending on the pane curvature, a trapping of air between the housing 1 and the vehicle pane can hardly be avoided if the size of the end face 2 exceeds a certain value. Due to sealing properties of the coupling medium, air bubbles once enclosed cannot leave the region of the coupling medium.

This poses an aesthetic problem on the one hand, since enclosed air bubbles appear as light areas silhouetted against a generally dark background of the sensor housing. On the other hand, they also raise technical problems since they can affect operation of the sensor. In particular, an air bubble in a region of incident light of the optical sensor can render the sensor signal useless, so that the whole device must be regarded as non-functional.

To solve this problem, the device of the invention has exhaust ducts communicating with ambient air about the device, which allow a subsequent exhaustion of air from the electronic device.

Figure 2:
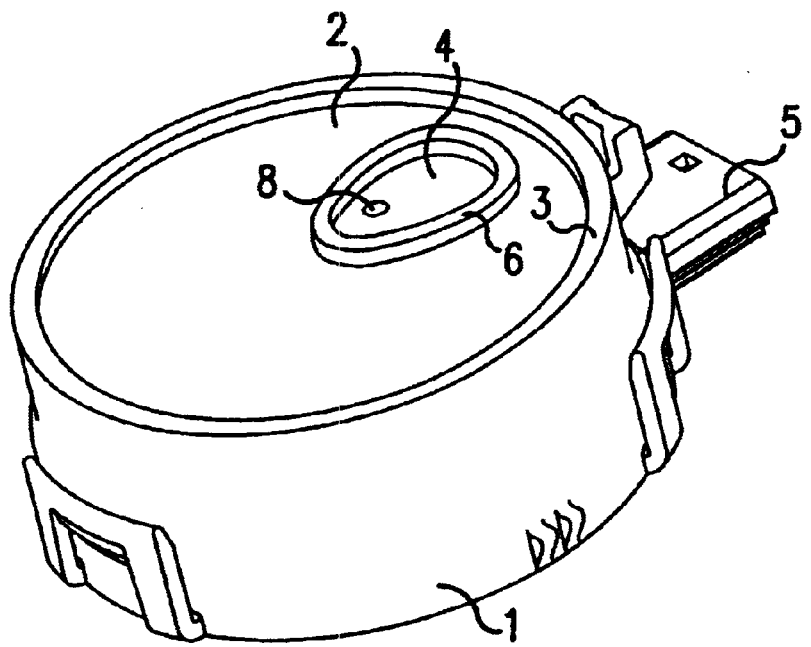

FIGS. 1 and 2 show two possible embodiments of these exhaust ducts. In FIG. 1, an exhaust duct 7 is formed between the first rim 3 and a second rim 6 surrounding the optical sensor 4 by two raised shoulders, through which air from the region of the optical sensor 4 can escape to the outside.

In the embodiment shown in FIG. 2, an exhaust duct is led into the interior of the housing in the region of the optical sensor. An end portion of the exhaust duct structured as an exhaust opening 8 can be seen. The exhaust duct can be beneficially structured to extend through the housing to another outside surface of the housing 1.

What is claimed is:

1. An electronic device comprising:
   a housing for continuing at least one sensor;
   a first rim substantially circumscribing a second rim, the second rim forming a coupling free region;
   a coupling for at aching the housing to a vehicle pane, the coupling substantially enclosing a region formed between the first rim and the second rim; and
   an exhaust duct connecting the coupling free region to ambient air outside of the housing.

2. The electronic device of claim 1, wherein the exhaust duct is structured to define a region free of coupling extending from an area of potential bubble formation to the ambient air, which extends to a outside surface of the housing.

3. The electronic device of claim 1, wherein the exhaust duct is structured to define a region free of coupling extending from an area of potential bubble formation to the ambient air, which starts at an exhaust opening in a surface of the housing and extends into the interior of the housing.

4. The electronic device of claim 3, wherein the exhaust duct extends through the interior of the housing to an outside surface of the housing.

5. The electronic device of claim 1, wherein the sensor is an optical sensor.

6. The electronic device of claim 1, wherein the electronic device further comprises a transmitter and a receiver for infrared radiation.

7. The electronic device according to claim 1, wherein the housing contains a plurality of sensors therein.

8. The electronic device according to claim 1, wherein the coupling further comprises a flexible rubber- or gel-like material.

9. The electronic device according to claim 1, wherein the exhaust duct forms an air channel that traverses the first rim and the second rim.

10. The electronic device according to claim 1, wherein a surface of the first rim contacts the vehicle pane.

11. The electronic device according to claim 1, wherein a surface of the second rim contacts the vehicle pane.

12. The electronic device according to claim 1, wherein the housing further include a connector, which provides a conduct for electrical signals.

13. The electronic device according to claim 12, wherein the connector is molded into the housing.

14. The electronic device according to claim 1, wherein the region formed between the first rim and the second rim is displaced in a different plane than a surface of the first or second rim, which contacts the vehicle pane.

15. The electronic device according to claim 1, wherein the first and second rim is integrally molded into the housing.

16. The electronic device according to claim 1, wherein the second rim includes a sensor region by circumscribing a light entrance opening of the sensor.

17. The electronic device according to claim 16, wherein the sensor is a light sensor.

18. The electronic device according to claim 1, wherein a sensor is provided in the region formed between the first rim and the second rim.

19. The electronic device according to claim 18, wherein the sensor is a rain sensor.

20. An electronic device comprising:
   a housing for containing a sensor;
   a first rim completely circumscribing a second rim, the second rim forming a coupling free region;
   a coupling for attaching the housing to a vehicle pane, the coupling substantially enclosing a region formed between the first rim and the second rim; and
   an exhaust duct connecting the coupling free region to ambient air outside of the housing.

* * * * *